United States Patent [19]

Fisher et al.

[11] 3,937,035
[45] Feb. 10, 1976

[54] UNIVERSAL JOINT
[75] Inventors: Leslie George Fisher, Birmingham; Bertram Joseph Palmer, Barton-under-Needwood, Near Burton-on-Trent, both of England
[73] Assignee: GKN Transmissions Limited, Birmingham, England
[22] Filed: Nov. 8, 1974
[21] Appl. No.: 522,151

[30] Foreign Application Priority Data
Nov. 9, 1973 United Kingdom............... 52110/73

[52] U.S. Cl. ............................... 64/17 A; 308/236
[51] Int. Cl.² .......................................... F16D 3/26
[58] Field of Search ............. 64/17 A, 17 SP, 17 R; 308/236

[56] References Cited
UNITED STATES PATENTS
2,512,691 6/1950 Smith et al........................... 64/17 A
3,062,026 11/1962 Pitner ................................... 64/17 A
3,178,907 4/1965 Lyons .................................. 64/17 A
3,721,110 3/1973 Borenan............................... 64/17 A Primary Examiner—Samuel Scott
Assistant Examiner—Randall Heald
Attorney, Agent, or Firm—A. Yates Dowell, Jr.

[57] ABSTRACT

In a Hooke's joint comprising two yoke elements interconnected by a connecting member, the connecting member has trunnions received in respective bearing cups which are fitted in apertures formed in the arms of the yoke elements. Each arm of each yoke element has a retaining element to retain the associated bearing cup in the opening of the arm. The retaining element on one arm of each yoke element is adapted to bias the associated bearing cup towards the centre of the joint; whereas the retaining element on the other arm of the yoke element is adapted to function as a rigid stop to limit movement of the associated bearing cup away from the centre of the joint but not to bias the bearing cup inwardly of the joint.

7 Claims, 9 Drawing Figures

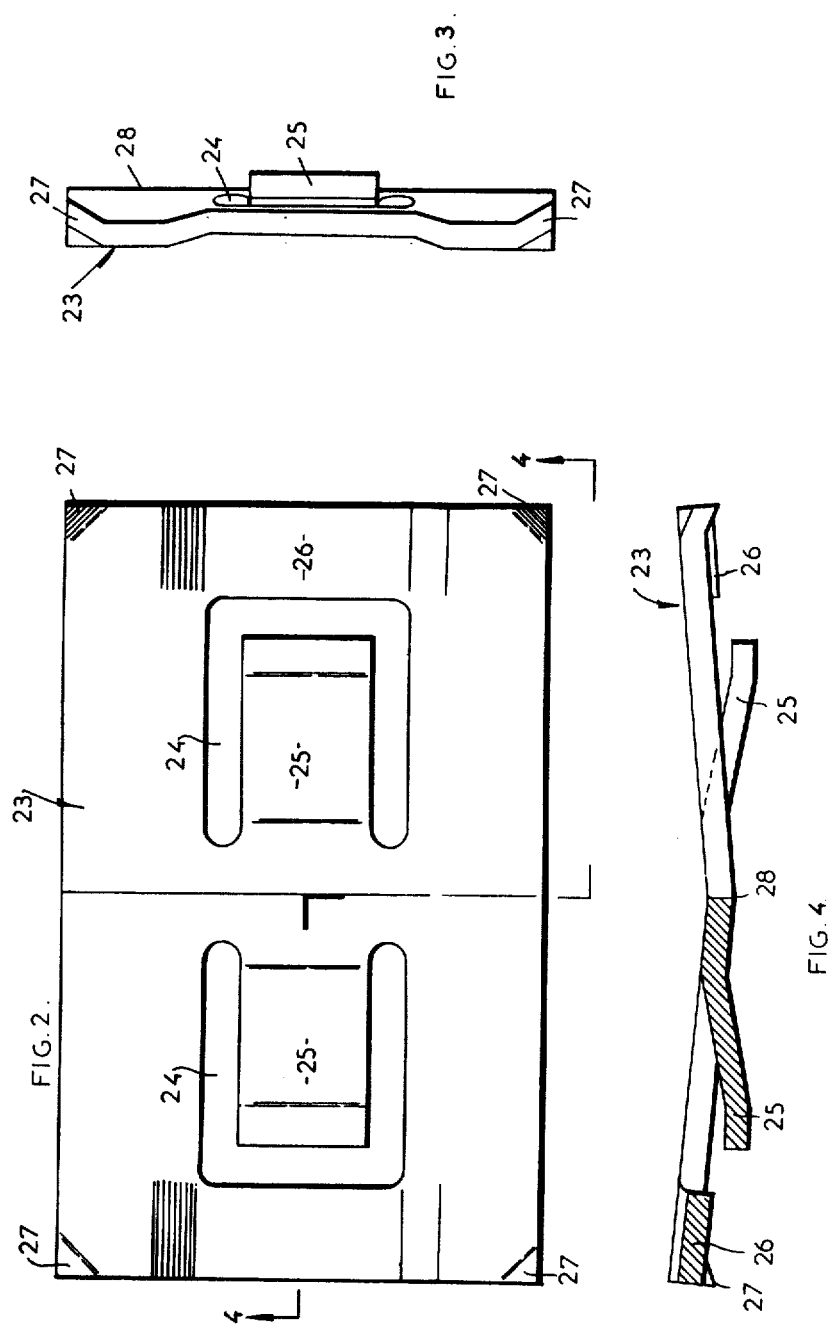

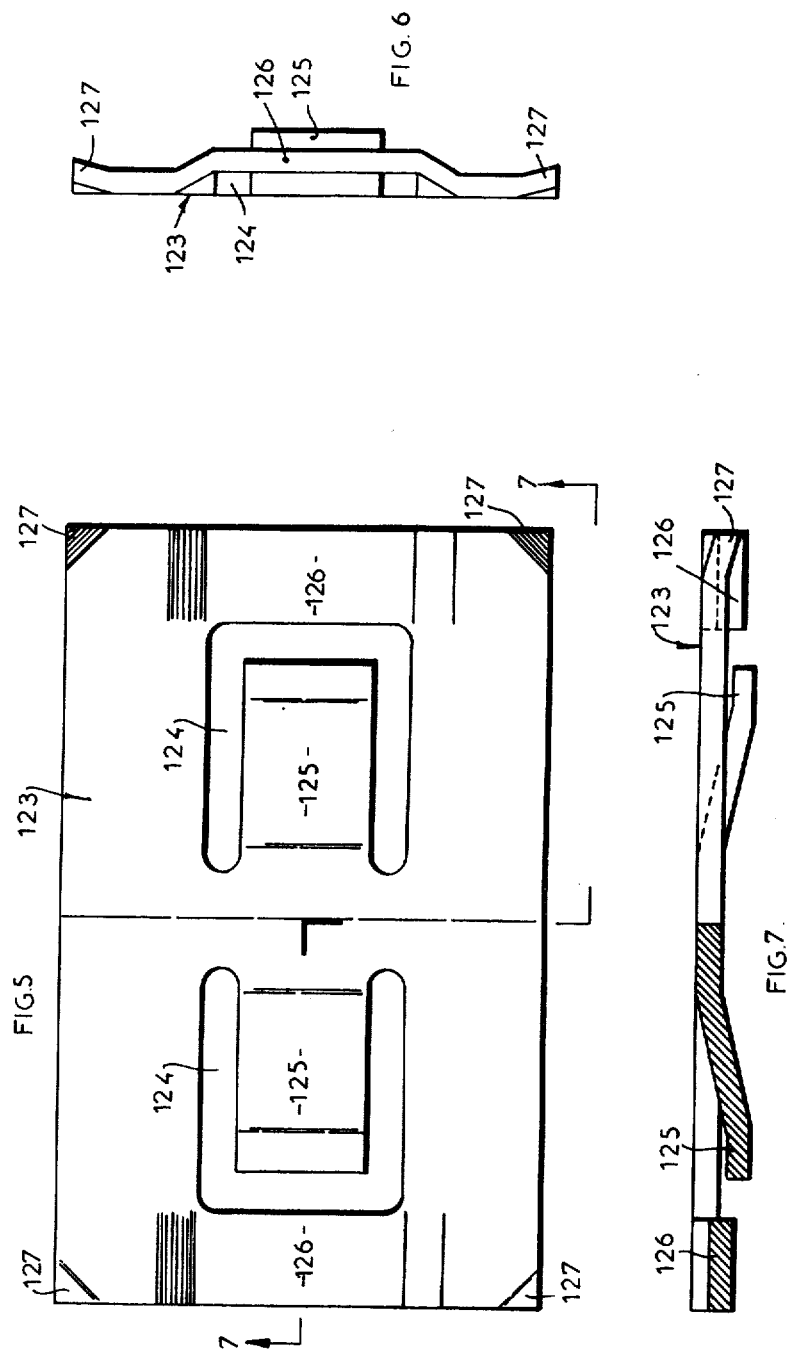

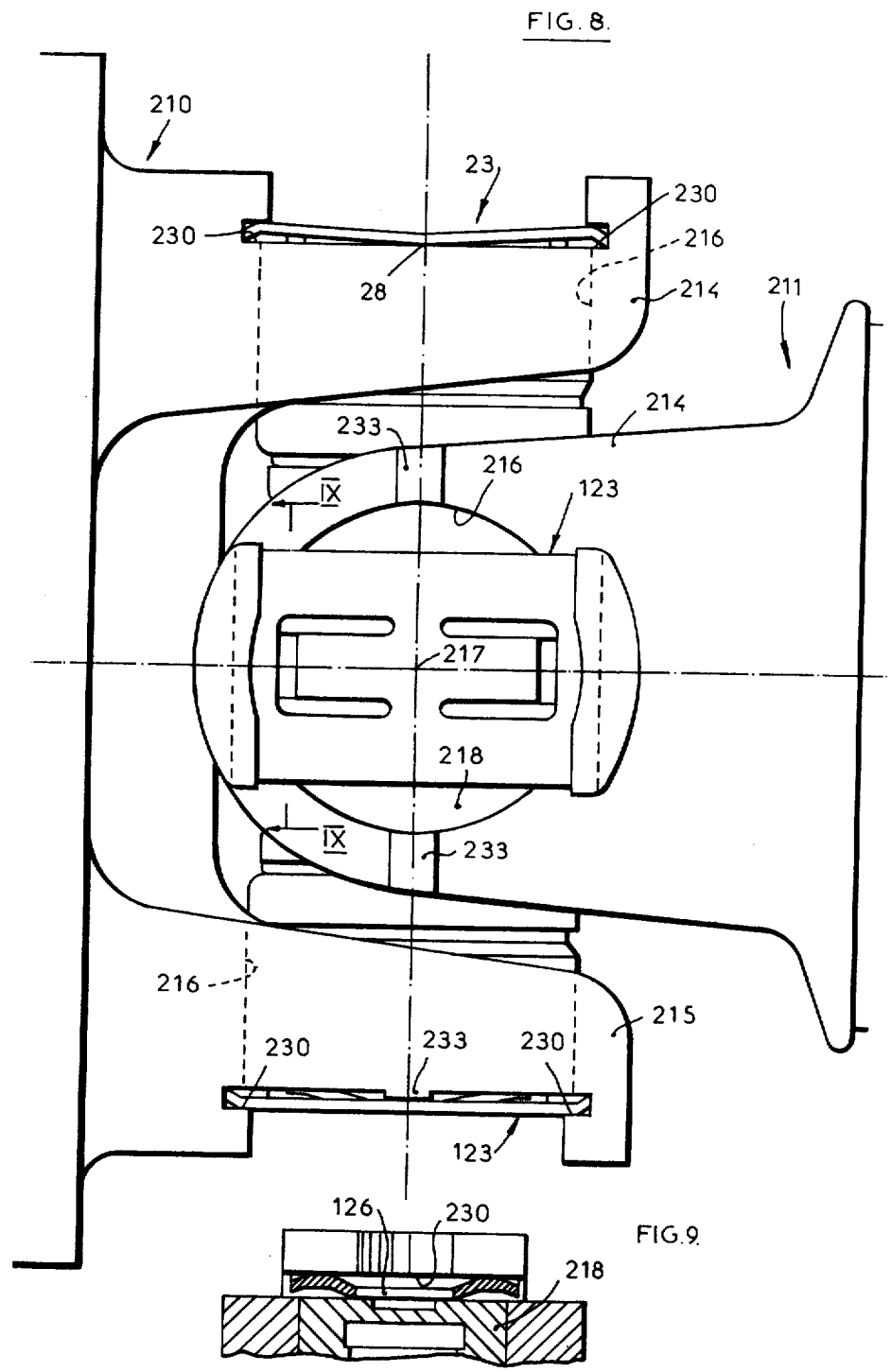

UNIVERSAL JOINT

BACKGROUND TO THE INVENTION

This invention relates to a universal joint of the Hooke's type, hereinafter referred to as a Hooke's joint.

A Hooke's joint comprises two yoke elements which in use rotate about respective axes (hereinafter called the rotary axes), these rotary axes coinciding in the straight position of the joint. Each yoke element includes a base portion and a pair of arms projecting axially from the base portion at diametrically opposite positions with respect to the rotary axis of the yoke element. The joint further comprises a connecting member pivotally connected to the arms of one yoke element and to the arms of the other yoke element for movement about respective mutually-perpendicular pivot axes which, in the straight position of the joint, are also perpendicular to the rotary axes of the yoke elements. The shafts or other rotary elements which are required to be coupled through the intermediary of the joint are integral with or connected to the base portions of respective yoke elements.

A common construction of Hooke's joint includes yoke elements, each of which has a pair of aligned circular openings formed one in each arm of the element, bearing cups in these openings, trunnions provided on the connecting member and received in respective ones of the bearing cups and needle bearings interposed between the trunnions and the bearing cups. Four retaining elements are provided, one on each arm of each yoke element, to retain the associated bearing cups within their respective openings.

It is desirable to avoid movement of the connecting member relative to either of the yoke elements in a direction along the pivot axis of that yoke element. Such movement will cause wear of components of the joint and will enable the centre of gravity of the connecting member to move from the rotary axis of one or both yoke elements so that the joint is out of balance. Rotation of a Hooke's joint in an out of balance condition generates vibration which can give rise to serious wear and to excessive generation of noise.

When the components of Hooke's joints are formed in a reasonably economical manner, it is inevitable that the dimensions of the components will vary within acceptable tolerance ranges. The existance of such variations gives rise to difficulty in avoiding freedom for movement of the connecting member relative to the yoke elements along the pivot axes thereof.

SUMMARY OF THE INVENTION

According to the present invention we provide a Hooke's joint wherein the connecting member includes trunnions which are received in openings formed in respective arms of the yoke elements and retaining means is provided on each arm for controlling movement of the associated trunnion relative to the arm in a direction outwardly of the joint, characterised in that the retaining means on one arm of each yoke element is adapted to bias the associated trunnion in a direction inwardly of the joint along the pivot axis of the yoke element and in that the retaining means on the other arm of each yoke element is adapted to function as a rigid stop, positively to limit movement of the associated trunnion in a direction outwardly of the joint but not to bias the trunnion inwardly of the joint.

With this construction, the connecting member normally adopts a limit position relative to the yoke elements which is defined by the retaining means adapted to function as a stop. During manufacture, the joint would be balanced with the connecting member in this limit position.

A Hooke's joint in accordance with the present invention has a considerable advantage over a Hooke's joint wherein there is provided on each arm of each yoke element a retaining element which is adapted to bias the associated trunnion in a direction inwardly of the joint along the pivot axis of the yoke element. With this latter construction, there is substantially no opposition to a very small movement of the connecting member relative to the yoke elements, since the retaining elements bias the connecting member in opposite directions. Movement of the connecting member in one direction along the pivot axis of a yoke element is opposed by one retaining element and assisted by the other retaining element. Thus, it is possible for the connecting member to move relative to the yoke elements to a position in which the centre of gravity of the connecting member is offset from one or both rotary axes. If the joint if rotated in this condition, further displacement of the connecting member relative to the yoke elements will be promoted by centrifugal action. It will be appreciated that in a Hooke's joint where each yoke arm is provided with a retaining element adapted to bias the associated trunnion inwardly of the joint, the joint can become unbalanced in use and give rise to vibration.

In a Hooke's joint constructed in accordance with the present invention, any movement of the connecting member relative to the yoke elements out of the limit position is opposed by the retaining means adapted to bias the trunnions but is not assisted by any of the retaining means.

BRIEF DESCRIPTION OF THE DRAWINGS

FIG. 2 shows on an enlarged scale a plan view of a first form of retaining element incorporated in the joint of FIG. 1;

FIG. 3 shows the retaining element of FIG. 2 in end elevation;

FIG. 4 shows the retaining element in section on the line 4—4 of FIG. 2;

FIG. 5 shows, to the same scale as FIG. 2, a second form of retaining element incorporated in the joint of FIG. 1;

FIG. 6 shows the retaining element of FIG. 5 in end elevation;

FIG. 7 shows the retaining element in section on the line 7—7 of FIG. 5,

FIG. 8 shows in side elevation a further example of Hooke's joint in accordance with the invention, and FIG. 9 is a fragmentary sectional view on the line IX — IX of FIG. 8.

DETAILED DESCRIPTION

Figure 1:
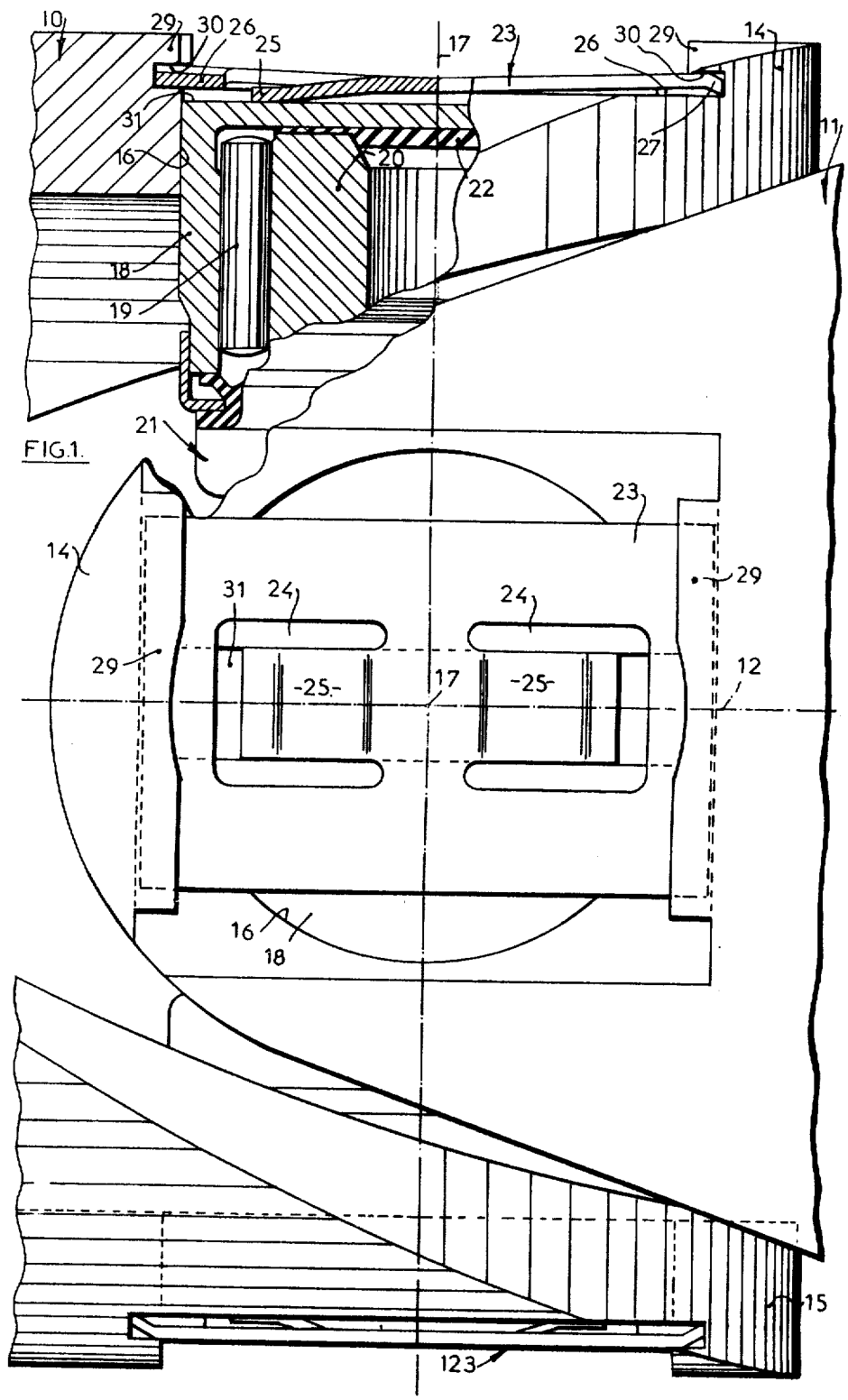
FIG. 1 shows a Hooke's joint in accordance with the invention partly in side elevation and partly in cross-section.

The joint illustrated in FIG. 1 comprises two yoke elements 10 and 11 which, when the joint is in use, rotate about respective rotary axes. In the straight position of the joint, which is illustrated in FIG. 1, these axes coincide and are indicated by the reference numeral 12. Each yoke element includes a tubular base portion (not shown) and a pair of arms 14 and 15 integral with the base portion and projecting therefrom in the axial direction at diametrically opposite positions with respect to the axis 12.

The arms 14 and 15 of each yoke element are formed with respective circular openings 16 which lie on a pivot axis 17 of the yoke element, this pivot axis being perpendicular to the rotary axis of the yoke element. A bearing cup 18 is received in each of the openings 16, these bearing cups containing needle bearings 19 and receiving respective trunnions 20 of a connecting member 21. The yoke elements 10 and 11 are therefore connected together through the intermediary of the connecting member 21, which member can pivot relative to each of the yoke elements about the pivot axis 17 of the yoke element.

A thrust washer 22 is interposed between the end face of each trunnion 20 and the end wall of the associated bearing cup 18 so that forces directed along the corresponding pivot axis can be transmitted from each trunnion to the associated bearing cup without interfering with relative pivoting movement.

For controlling movement of each bearing cup 18 relative to the associated yoke arm 14 or 15 in a direction outwardly of the joint, and thereby retaining the bearing cups within their respective openings 16, each of the yoke arms is provided with a retaining element. The retaining element provided on the arm 14 of each yoke element is indicated by the reference numeral 23 and is shown in detail in FIGS. 2 to 4. The retaining element provided on the arm 15 of each yoke element is indicated by the reference numeral 123 and is shown in detail in FIGS. 5 to 7.

The retaining element 23 is of plate-like form and is of rectangular shape, as viewed in plan. Two U-shaped slots 24 are pierced in the retaining element to form corresponding fingers 25 which are of substantially rectangular shape. These fingers are integrally connected with the remainder of the retaining element at positions near to the centre of the retaining element, the fingers projecting in opposite longitudinally outward directions towards the shorter margins of the retaining element. The fingers 25 are bent from the plane of adjacent portions of the retaining element in the same direction, a downward direction as viewed in FIG. 4.

End portions 26 of the retaining element 23, each of which end portions lies between a respective one of the slots 24 and an adjacent shorter margin of the retaining element, are deformed to a shallow channel shape, as the retaining element is viewed in end elevation. A mid-region of each of the end portions 26 is displaced downwardly slightly relative to the opposite lateral regions of the end portions, typically by a distance less than the thickness of the material of which the retaining element is formed. Corner portions 27 of the retaining element are also bent downwardly. The retaining element is also bent along a line which lies mid-way between the end portions 26 into a shallow V-shape, as viewed in side elevation. The apex 28 of this V-shape is presented downwardly, as seen in FIG. 4.

A part of the thickness of each of the yoke arms 14 and 15 is removed over a substantially rectangular area adjacent to the free end of the arm, this area including the opening 16, to form a recess in the radially outwardly presented surface of the arm. Along two opposite boundaries of this recess there are formed undercut lips 29 which define respective grooves 30. The lengths of these grooves 30 extend in a direction perpendicular to both the pivot axis and rotary axis of the yoke element in which the grooves are formed. Each of the grooves 30 is open at both ends.

When the joint is assembled, the grooves 30 of the yoke arm 14 of the yoke element 10 receive an anchorage portion constituted by respective marginal parts of the end portions 26 of the retaining element 23 so that a further part of the respective end portion projects from the mouth of each of the grooves 30 to overlie the associated bearing cup 18. As the retaining element 23 is forced into the grooves 30, the channel shape of the end portions 26 and the bent corner portions 27 will be deformed somewhat and a tight fit of the retaining element within the groove 30 is thereby assured.

The outwardly presented end face of each of the bearing cups 18 is formed with a groove 31 which extends from one side of the bearing cup to the other in a direction parallel to the rotary axis of the associated yoke element. As the retaining element 23 is forced into the grooves 30, the fingers 25 will be displaced resiliently outwardly of the joint by engagement with the end wall of the bearing cup. Such displacement is permitted partly by deflection of the fingers themselves relative to adjacent parts of the retaining element, and partly by resilient bending of the retaining element as a whole about the apex 28 so that the retaining element deforms towards a flat condition. However, when the retaining element is inserted sufficiently far along the grooves 30 for the fingers 25 to be aligned with the grooves 31, the fingers will snap into this groove and thereby prevent further displacement of the retaining element relative to the yoke element. The fingers will also restrain the bearing cup against angular movement relative to the yoke element about the pivot axis 17 of the yoke element, since abutment faces of the cup which define the sides of the groove 31 engage with abutment faces of the retaining element presented by the fingers 25.

Portions of the bearing cup 18 alongside the groove 31 will engage the apex 28 of the retaining element 23 and axial thrust transmitted from the associated trunnion to the bearing cup will be transferred to the retaining element at this apex. The retaining element 23 is so formed that it defines a shallower V-shape when the joint is assembled than it does when the retaining element is free of external constraint. Thus, the retaining element will bias the associated bearing cup 18 in a direction inwardly of the joint. The retaining element can yield resiliently to permit movement of the bearing cup in a direction outwardly of the joint until the V-shape of the retaining element is substantially flattened and the bearing cup engages with the end portions 26 of the retaining element where these end portions project from the grooves 30. Since these end portions are of shallow channel shape and are a close fit within the grooves 30, these end portions will not deflect resiliently under pressure from the bearing cup. It will therefore be understood that movement of the bearing cup relative to the associated yoke element in a direction outwardly of the joint is positively limited by the retaining element. Under normal conditions of use, the bearing will be engaged only by a constraining portion of the retaining element constituted by the fingers 25 and apex 28.

The retaining element 123 differs from the retaining element 23 shown in FIGS. 2, 3 and 4 in that it is not bent to a shallow V-shape, as viewed in side elevation.

In other respects the element 123 is similar to the element 23 and corresponding parts are indicated in FIGS. 5, 6 and 7 by like reference numerals with the prefix 1. End portions 126 of the retaining element 123 are bent to a shallow channel shape, as viewed in end elevation, similar to the channel shape of the end portions 26 of the element 23. Accordingly, this further retaining element is, relative to the element 23, rigid and incapable of biasing the associated bearing cup in a direction inwardly of the joint. The further retaining element is, however, adapted to function as a rigid stop to limit movement of the associated bearing cup in a direction outwardly of the joint. In the assembled joint the associated bearing cup 18 engages with the end portions 126 of the retaining element 123 adjacent to the grooves 30. As these end portions are not significantly flexible, they prevent outward movement of the bearing cup. The further retaining element is mounted in the grooves 30 formed in the arm 15 in a manner exactly analogous to the mounting of the element 23 in grooves formed on the arm 14.

When the joint is assembled, the retaining element 123 is inserted before the retaining element 23. When inserted, the element 23 urges the connecting member 21 in a direction towards the retaining element 123 mounted on the arm 15. Thus the connecting member normally occupies a limit position relative to the yoke element 10 which is defined by the retaining element 123. Forces which may be applied to the connecting member during normal use of the joint would be insufficient to displace the connecting member from this limit position.

The arms 14 and 15 of the yoke element 11 are provided with retaining elements, one of these being identical with the retaining element 23 and the other being identical with the retaining element 123 hereinbefore described. It will be understood that all four retaining elements are mounted in a similar manner on their respective yoke arms and that the retaining elements associated with the yoke element 11 co-operate with respective bearing cups 18 in a manner exactly analogous to that in which the retaining elements associated with the yoke element 10 co-operate with respective bearing cups.

The yoke elements 10 and 11 of the joint illustrated in FIG. 1 are each formed from tubular metal stock. In FIGS. 8 and 9 there is illustrated a joint having yoke elements which are formed by a forging operation. The joint shown in FIGS. 8 and 9 incorporates the retaining elements 23 and 123 hereinbefore described with reference to FIGS. 2 to 6. Certain other parts of the joint shown in FIGS. 8 and 9 correspond to parts already described with reference to FIG. 1. Such corresponding parts are indicated in FIGS. 8 and 9 by like references with the prefix 2 and the preceding description is deemed to apply, except for the differences hereinafter mentioned.

The arms 214 and 215 of each of the forged yoke elements 210 and 211 are formed with respective flat surfaces surrounding the openings 216 in which the bearing cups 218 are received. Along two opposite margins of each such flat surface there are formed grooves 230 in which the shorter margins of the retaining elements 23 and 123 are received. The arm 215 of each yoke element which receives the retaining element 123 adapted to function as a rigid stop is formed with a pair of small projections 233 situated at opposite sides of the opening 216 and midway between the grooves 230. These projections enable the arms 215 to be distinguished from the arms 214 intended to receive the retaining elements 23 which are adapted to bias the associated trunnions. Furthermore, the projections 233 prevent insertion of the retaining element 23 into the grooves 30 of the arm 215, as the apex 28 of the retaining element could not pass over the projections 23.

As can be seen from FIG. 9, that part of an end portion 126 of a retaining element 123 which is received in one of the grooves 230 is an interference fit in the groove and that part of the end portion 126 which lies outside the groove 230 is engaged with the end face of an associated bearing cup 218. As the end portion 126 is of shallow U-shape, it is substantially inflexible and acts as a rigid stop against which the bearing cup is urged by the corresponding retaining element 23.

We claim:

1. In a Hooke's joint comprising two yoke elements, each having first and second arms, four bearing cups disposed within respective openings formed one in each of said arms, a connecting member having four trunnions, each trunnion received within a respective one of the bearing cups and retaining means provided on the yoke arms for retaining respective ones of the bearing cups within respective ones of said openings, the improvement wherein:

the retaining means provided on said first arm of each yoke element comprises a first retaining element, an anchorage portion of said first retaining element is engaged with said first arm and is held in a fixed position with respect to said first arm, a constraining portion only of said first retaining element is engaged with the respective bearing cup, said constraining portion is spaced from said anchorage portion and is resiliently-displaceable relative thereto, the retaining means provided on said second arm of each yoke element comprises a second retaining element, an anchorage portion of said second retaining element is engaged with said second arm and is held in a fixed position with respect to said second arm, a respective one of said bearing cups is engaged with a constraining portion of said second retaining element, and said constraining portion of the second retaining element adjoins the anchorage portion thereof and is substantially immovable relative to said anchorage portion, whereby said first retaining element is adapted to bias the associated bearing cup in a direction inwardly of the cup and said second retaining element is adapted to function as a rigid stop positively to limit movement of the associated bearing cup in a direction outwardly of the joint but not to bias the bearing cup inwardly of the joint.

2. The improvement according to claim 1 wherein the anchorage portion of each retaining element comprises two opposite marginal portions and said constraining portions are between the marginal portions.

3. The improvement according to claim 2 wherein each of said yoke arms is formed with a pair of parallel grooves which face each other across the opening of the arm and said marginal portions of the retaining element provided on the arm are received one in each of said grooves.

4. The improvement according to claim 3 wherein said first retaining element is of plate-like form and is bent to a shallow V-shape including an apex, said marginal portions are spaced from and are on opposite sides of the apex, and said constraining portion includes the apex.

5. The improvement according to claim 3 wherein each of said marginal portions of the second retaining element and the adjoining constraining portion are channel-shaped in cross-section, the base and sides of the channel being common to the marginal portion and adjoining constraining portion.

6. The improvement according to claim 3 wherein each bearing cup and the retaining element associated therewith have respective mutually-engaged abutment faces which are presented in directions extending lengthwise of said grooves formed in the yoke arms and prevent movement of the retaining element along said grooves.

7. The improvement according to claim 6 wherein each bearing cup has an end face, a groove is formed in said end face, said abutment faces of the cup define the sides of the groove formed in said end face, and the retaining element has fingers which extend into said groove formed in the end face of the associated bearing cup and present said abutment faces of the retaining element.

* * * * *